US 6,824,206 B1

United States Patent
Tolinski

(10) Patent No.: US 6,824,206 B1
(45) Date of Patent: Nov. 30, 2004

(54) ONE-PIECE SUNSHADE ASSEMBLY HAVING AN INTEGRATED HANDLE RECESS AND GUIDE RAILS

(75) Inventor: Roch J. Tolinski, Howell, MI (US)

(73) Assignee: Meritor Light Vehicle Technology, LLD, Troy, MI (US)

( * ) Notice: Subject to any disclaimer, the term of this patent is extended or adjusted under 35 U.S.C. 154(b) by 306 days.

(21) Appl. No.: 09/652,289

(22) Filed: Aug. 31, 2000

(51) Int. Cl.[7] .................................................. B60J 7/00
(52) U.S. Cl. ....................................... 296/214; 49/421
(58) Field of Search ........................... 296/214; 49/414, 49/421

(56) References Cited

U.S. PATENT DOCUMENTS

| | | | |
|---|---|---|---|
| 4,038,881 A | | 8/1977 | Conrad |
| 4,379,586 A | | 4/1983 | Kaltz et al. |
| 4,422,687 A | | 12/1983 | Kaltz et al. |
| 4,844,532 A | * | 7/1989 | Ono et al. ............... 296/214 X |
| 4,867,220 A | | 9/1989 | Matsumoto et al. |
| 5,005,899 A | | 4/1991 | Clenet |
| 5,593,204 A | | 1/1997 | Wahl et al. |
| 5,976,646 A | * | 11/1999 | Stevens et al. ......... 296/214 X |
| 6,050,632 A | | 4/2000 | Aoki et al. |
| 6,155,636 A | * | 12/2000 | Stehning et al. ............ 296/214 |
| 6,231,118 B1 | * | 5/2001 | Yera ........................... 296/214 |

FOREIGN PATENT DOCUMENTS

JP              359202935     * 11/1984    .................. 296/214

OTHER PUBLICATIONS

Article: "Lightweight Polyurethane Gains More Ground", Ward's Auto World, May, 1998.

* cited by examiner

*Primary Examiner*—Dennis H. Pedder
(74) *Attorney, Agent, or Firm*—Carlson, Gaskey & Olds

(57) ABSTRACT

A one-piece sunshade assembly for covering a vehicle sunroof includes guide flanges and a handle integrated into a sunshade panel that covers the sunroof. The guide flanges, handle, and sunshade panel are all formed from the same molding process to form the one-piece sunshade assembly from a plastic material such as polypropylene. An occupant of the vehicle grasps the handle that is molded to be recessed in the sunshade panel to slide the panel and cover and uncover the sunroof. The guide flanges extend from the sunshade panel to slidably engage guide rails and guide the panel as it is slid.

17 Claims, 2 Drawing Sheets

ONE-PIECE SUNSHADE ASSEMBLY HAVING AN INTEGRATED HANDLE RECESS AND GUIDE RAILS

BACKGROUND OF THE INVENTION

The subject invention relates to an integrated one-piece sunshade assembly for covering a sunroof of a vehicle.

Sunshade assemblies are known in the art. Conventional sunshade assemblies include a sunshade panel that covers the sunroof of the vehicle, and other added parts for guiding and sliding the assembly within guide rails between an open and closed position. A conventional sunshade assembly as shown in FIG. 1 includes a clip-on metal guide 10 for guiding the assembly within the guide rails. The conventional sunshade assembly as shown in FIG. 2 also includes a snap-in cup 12 used as a handle recess for sliding the assembly between the open and closed positions.

In the prior art, the added parts, such as the clip-on metal guide and the snap-in cup, are assembled to the sunshade panel. It is costly to separately assemble such parts to the panel. Also, the parts frequently become loose and are a primary source of vibration, rattling, and even breaking in the vehicle. Further, these separate parts increase inventory costs and concerns for manufacturers of the sunshade assemblies.

It would be desirable to introduce an integrated one-piece sunshade assembly having guide flanges and a handle recess molded into a sunshade panel to form the one-piece sunshade assembly and eliminate separate parts added to the assembly.

SUMMARY OF THE INVENTION AND ADVANTAGES

A sunshade assembly for covering a sunroof is mounted within guide rails in a roof of a vehicle for sliding between open and closed positions. The sunshade is mounted beneath a moonroof/sunroof.

The inventive sunshade assembly is a one-piece sunshade assembly including a panel for covering the sunroof, and other parts that are integrated into the sunshade panel for sliding the sunshade between the open and closed positions and for guiding the sunshade panel as it slides. More specifically, guide flanges and a handle recess are integrated into the sunshade panel by being molded in the same process that forms the sunshade panel. The guide flanges are molded into the sunshade panel for guiding the sunshade assembly within the guide rails. The handle recess is molded into the sunshade panel to provide a grasping surface for an occupant of the vehicle to slide the sunshade assembly into the open and closed positions. Since the guide flanges and the handle recess are molded into the sunshade panel, these parts are formed of the same molded plastic material as the sunshade panel and are integral with the panel.

Accordingly, the subject invention provides an integrated one-piece sunshade assembly that eliminates the separate parts of the prior art thereby eliminating sources of vibration and rattling in the vehicle, and also reducing the costs associated with separately assembling these 'loose' parts to the sunshade panel.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
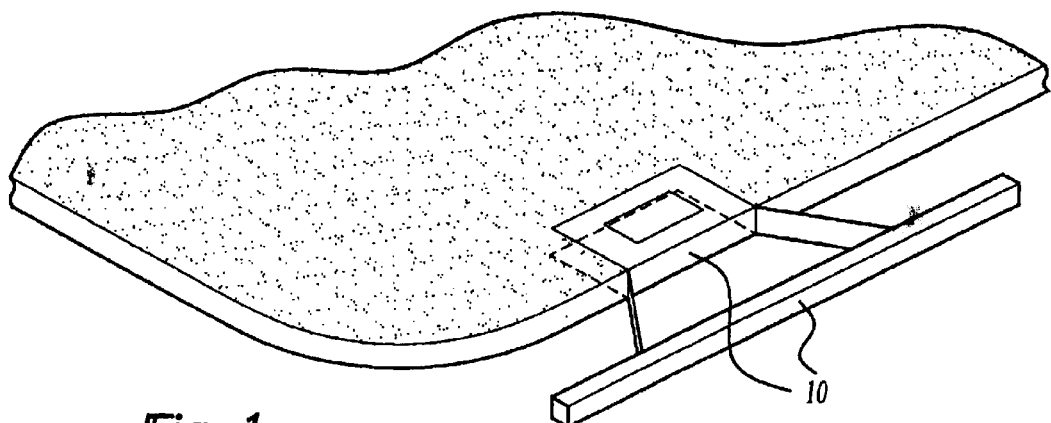
FIG. 1 is an enlarged perspective view of a prior art sunshade assembly with a separate clip-on metal guide.
Figure 2:
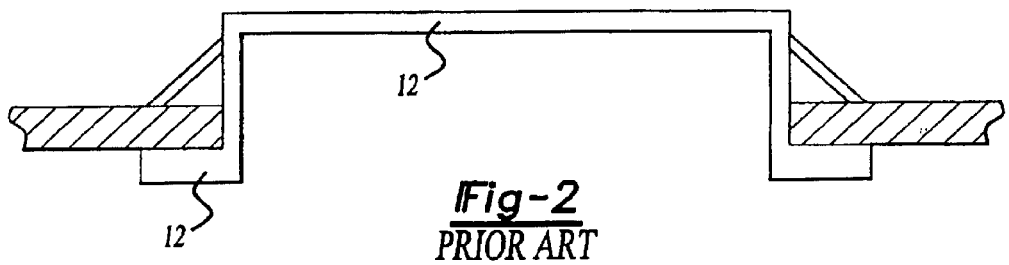
FIG. 2 is a cross-sectional view of a prior art sunshade assembly with a separate snap-in cup.
Figure 3:
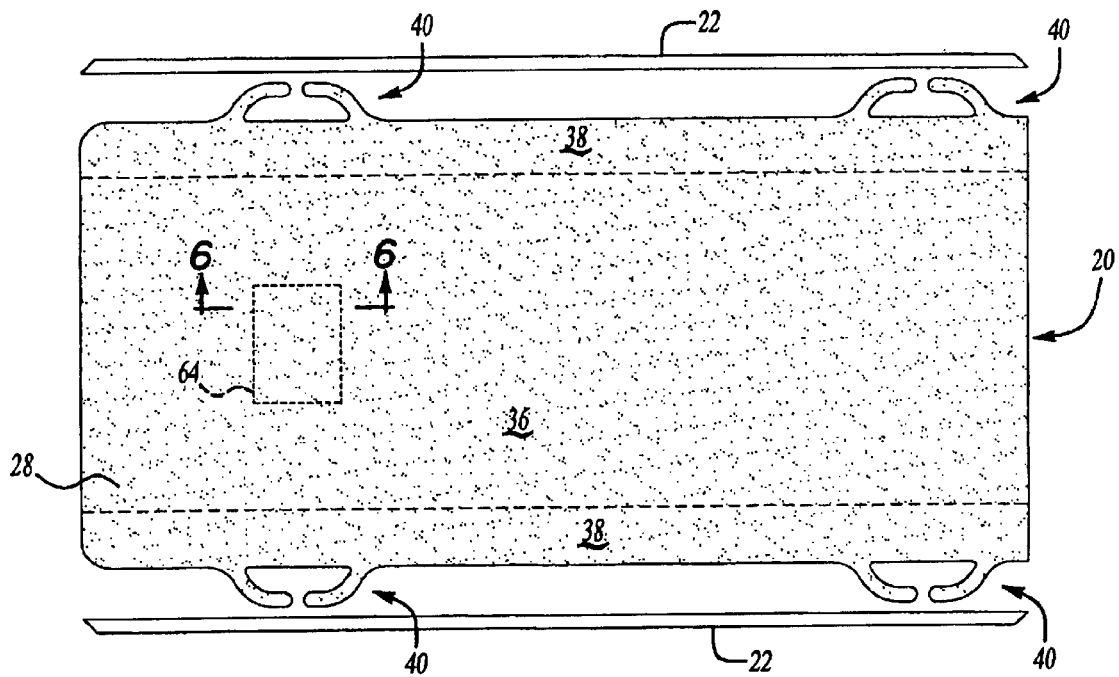
FIG. 3 is a top view of an integrated one-piece sunshade assembly.

As shown in FIG. 3, a sunshade assembly 20 covers a sliding glass panel, such as a sunroof 21 (FIG. 5), of a vehicle. The sunshade assembly 20 is slidable within guide rails 22 that are mounted to a roof of the vehicle. A complete sunshade guidance system is formed by the sunshade assembly 20 of the subject invention and the guide rails 22.

Figure 5:
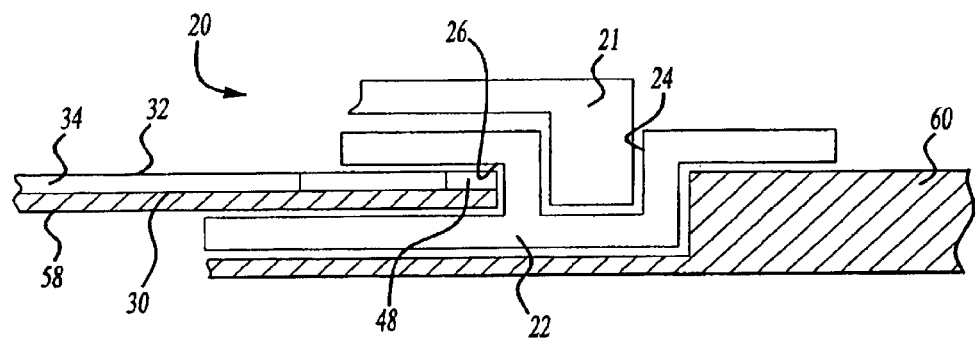
FIG. 5 is a cross-sectional view of the sunshade assembly taken along line A—A in FIG. 4 illustrating the second projection extending into the guide rail.

As shown in FIG. 5, the guide rails 22 include first and second channel sets 24, 26. The sunroof 21 of the vehicle is mounted within the first channel set 24 of the guide rails 22 to open or close. To open or close, the sunroof 21 can either slide, manually or automatically, or can be of a 'pop-up' design. The guide rails 22 are only represented schematically in the Figures and may be configured in manners other that as shown without affecting the scope of the subject invention. The sunshade assembly 20 is slidable in the guide rails 22 between an open position, where the sunroof 21 is visible to an occupant of the vehicle, and between a closed position, where the sunroof 21 is covered when viewed from a passenger compartment of the vehicle.

Referring primarily to FIG. 5, the sunshade assembly 20 includes a sunshade panel 28. The sunshade panel 28 is slidably mounted within the second channel set 26 of the guide rails 22 to slide between the open and closed positions to cover the sunroof 21. The sunshade panel 28 has first and second facings 30, 32, respectively.

Figure 4:
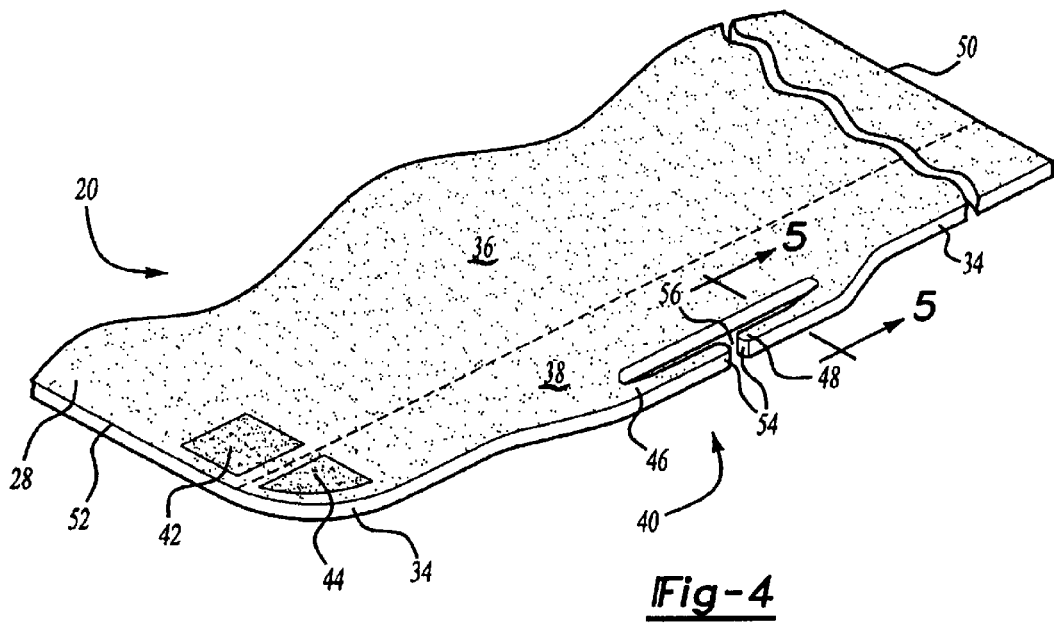
FIG. 4 is an enlarged perspective view of the sunshade assembly of the subject invention illustrating first and second projections of the guide flange.

As shown in FIGS. 4 and 5, a peripheral edge 34 extends between the facings 30, 32. The peripheral edge 34 defines four corners of the sunshade panel 28. Of course, it is to be understood that the corners may be sharp (i.e., 90 degree) corners or smooth, rounded corners without varying the scope of the subject invention. Also, for descriptive purposes, the sunshade panel 28 is defined to include a central segment 36 and first and second lateral segments 38. As appreciated by those skilled in the art, the first facing 30 defines an underside of the sunshade panel 28.

The subject invention incorporates at least one guide flange 40 to guide the sunshade panel 28 between the open and closed positions. More specifically, the guide flange 40 is formed along with the sunshade panel 28 in a molding process to be molded into the panel 28. In the preferred embodiment of the subject invention, there are four guide flanges 40 with one guide flange 40 at each corner of the sunshade panel 28. That is, a first guide flange 40 is molded into the sunshade panel 28 at the first corner of the panel 28, a second guide flange 40 is molded into the sunshade panel 28 at the second corner of the panel 28, and so on. The guide flanges 40 are molded into the sunshade panel 28 at the first and second lateral segments 38.

In the molding process for forming the integrated one-piece sunshade assembly 20 of the subject invention, the sunshade panel 28 and guide flanges 40 are formed of a molded plastic material, preferably polypropylene. More specifically, as represented schematically in FIG. 4, the central segment 36 of the sunshade panel 28 is formed of a fiber-reinforced molded plastic material 42, and the lateral segments 38 of the sunshade panel 28 are formed to have a lower fiber content 44 than the central segment 36. Preferably, the central segment 36 is formed of a fiberglass-reinforced molded plastic material, and the lateral segments are formed of a fiberglass-free molded plastic material. Reinforcing the molded plastic material with fiberglass contributes additional support to the sunshade panel 28 as desired. Alternatively, it is desirable that the lateral segments 38, where the guide flanges 40 are molded, remain somewhat flexible so that the sunshade panel 28 can 'give' and can properly slide within the guide rails 22.

Referring primarily to FIG. 4, the first guide flange 40 is shown in detail. For descriptive purposes only, the subject invention will be described below in detail with respect to only the first guide flange 40. The guide flange 40 is molded with the sunshade panel 28 to project outwardly from the peripheral edge 34 of the panel 28 and extend into the guide rails 22 for guiding the sunshade panel 28 between the open and closed positions to cover the sunroof 21. More specifically, the guide flange 40 extends into the second channel set 26 of the guide rails 22.

The guide flange 40 is further defined by first and second projections 46, 48 respectively. The first and second projections 46, 48 are molded into the sunshade panel 28 such that they will extend into the guide rails 22 for guiding the panel 28. As shown in FIG. 4, the projections extend from panel 28 to be continuous with the peripheral edge 34. The first projection 46 extends from the sunshade panel 28 toward a back end 50 of the panel 28 in opposition to the second projection 48 which extends from the sunshade panel 28 toward a front end 52 of the panel 28. The projections 46, 48 curve outwardly from the peripheral edge 34 and taper to a distal tip 54. The distal tips 54 of the first and second projections 46, 48 are adjacent, yet spaced from, one another. It is to be understood that the projections 46, 48 may extend outwardly from the peripheral edge 34 of the panel 28 in a curved manner, or otherwise, such as rigidly angled, without varying the scope of the subject invention.

The projections 46, 48 define an integral slot 56 of the guide flange 40. Further, at the point where the projections 46, 48 define the integral slot 56, the sunshade panel 28 is preferably formed of the fiberglass-free molded plastic material 44, as described above. As such, the integral slot 56, and the fiberglass-free material 44 provide flexibility to the sunshade panel 28. As the panel 28 slides between the open and closed positions, the integral slot 56 allows the projections 46, 48, which are spaced apart, to flex. Therefore, the sunshade panel 28 can still slide relatively effortlessly in the guide rails 22 even if the occupant is opening or closing the panel 28 with unevenly applied force.

As shown in FIG. 5, a fabric material 58 is disposed, preferably adhered via the molding process, on the first facing 30 of the sunshade panel 28. As such, the first facing 30, including the fabric material 58, is relatively continuous with a headliner 60 of the vehicle. In the preferred embodiment of the subject invention, the fabric material 58 adhered to the first facing 30 of the sunshade panel 28 is the same fabric material 58 included with the headliner 60. Therefore, when the sunshade assembly 20 is in the closed position, the sunshade assembly 20 and the headliner 60 define an interior roof of the passenger compartment. The fabric material 58 spans the integral slot 56 and is disposed on the first and second projections 46, 48. As such, it is the fabric material 58 that actually slides on the guide rails 22 as the panel 28 slides between the open and closed positions. By sliding the fabric material 58 directly on the guide rail 22, excessive noise is eliminated.

Figure 6:
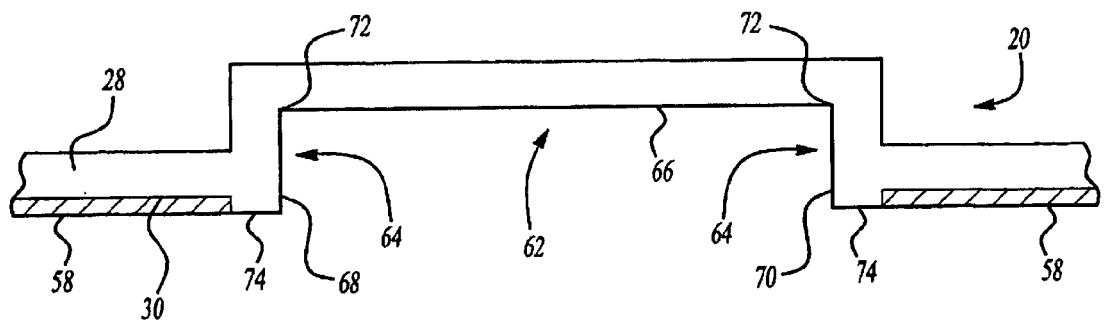
FIG. 6 is a cross-sectional view of the sunshade assembly taken along line B—B in FIG. 3 illustrating the handle recess of the subject invention molded into an underside of the sunshade panel.

Referring to FIG. 6, the integrated one-piece sunshade assembly 20 also molds a handle recess 62 into the underside of the sunshade panel 28. The handle recess 62 protrudes upwardly from the underside into the sunshade panel 28 to establish grasping surfaces 64. The occupant handles the grasping surfaces 64 to slide the sunshade panel 28 between the open and closed positions. As a result, the handle recess 62 can be molded into the sunshade panel 28 where it is convenient and comfortable for the occupant to manipulate the sunshade panel 28. Because the handle recess 62 is formed in the same molding process, the handle recess 62 is formed of the same molded plastic material as the sunshade panel 28 and the guide flanges 40, preferably polypropylene. The handle recess 62 can be molded into the sunshade panel 28 either in the central segment 36 (i.e., the fiberglass-reinforced segment) as in the preferred embodiment, or in the lateral segments 38 (i.e., the fiberglass-free segments) depending on the amount of support and rigidity required.

The handle recess 62 has generally C-shaped cross-section. The cross-section defines a ceiling portion 66 of the handle recess 62, and first and second sides 68, 70, respectively The first and second sides 68, 70 protrude downwardly from the ceiling portion 66 at lateral edges 72 of the ceiling portion 66 to establish the grasping surfaces 64. Although the ceiling portion 66 is offset from the first facing 30 to form the handle recess 62, the ceiling portion 66 is continuous with the first facing 30. The second side 70 of the handle recess 62 is preferably used as the grasping surface 64 to slide the sunshade panel 28 into the open position. Alternatively, the first side 68 of the handle recess 62 is used as the grasping surface 64 to slide the panel 28 into the closed position. Finally, as FIG. 6 illustrates, the fabric material 58 is disposed on the underside of the sunshade panel 28 to border a rim portion 74 of the handle recess 62 which is molded to project downwardly from the underside of the sunshade panel 28 in the same molding process. A section of the fabric material 58 is cut-out, to provide access to the integrated handle recess 62. As appreciated, the cut-out can be performed before, during, or after the molding process.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A vehicle window assembly comprising:

a sliding glass panel;

a sunshade panel that is slidable between an open and closed position for covering said glass panel, said sunshade panel having first and second facings, and a peripheral edge between said facings and including a central segment interposed between a pair of lateral segments located near peripheral edges of said sunshade panel wherein said central segment is formed from a first material and said lateral segments are formed from a second material that is more flexible than said first material;

guide rails for guiding said sunshade panel;

at least one guide flange molded into said lateral segments of said sunshade panel and projecting outwardly from said peripheral edge and extending into said guide rails for guiding said sunshade panel between the open and closed positions to cover said glass panel; and a fabric material disposed on said guide flange such that said fabric material slides on said guide rails between the open and closed positions.

2. An assembly as set forth in claim 1 including a handle recess molded into said central segment to establish a grasping surface for sliding said sunshade panel between the open and closed positions.

3. A vehicle window assembly comprising:

a sliding glass panel;

a sunshade panel that is slidable between an open and closed position for covering said glass panel, said sunshade panel having first and second facings, and a peripheral edge between said facings;

guide rails for guiding said sunshade panel; and at least one guide flange molded into said sunshade panel projecting outwardly from said peripheral edge and extending into said guide rails for guiding said sunshade panel between the open and closed positions to cover said glass panel, said sunshade panel and said guide flange being formed of a molded plastic material wherein a central segment of said sunshade panel is formed of a fiber-reinforced molded plastic material, and said guide flange is formed of a molded plastic material with a lower fiber content than said central segment.

4. A vehicle window assembly comprising:

a sliding glass panel;

a sunshade panel that is slidable between an open and closed position for covering said glass panel, said sunshade panel having first and second facings, and a peripheral edge between said facings;

guide rails for guiding said sunshade panel;

at least one guide flange molded into said sunshade panel projecting outwardly from said peripheral edge and extending into said guide rails for guiding said sunshade panel between the open and closed positions to cover said glass panel;

said guide flange defined by first and second projections that extend from said sunshade panel in opposed directions and extend into said guide rails, said projections being molded into said sunshade panel such that said projections extend from said sunshade panel to be continuous with said peripheral edge wherein each of said projections curve outwardly from said peripheral edge and taper to a distal tip, said projections extending from said sunshade panel such that said distal tip of said first projection is adjacent said distal tip of said second projection;

said projections being molded into said sunshade panel to define an integral slot of said guide flange, said integral slot providing flexibility to said sunshade panel as said sunshade panel slides between the open and closed positions; and a fabric material that spans said integral slot and is disposed on said projections such that said fabric material slides on said guide rails between the open and closed positions.

5. An assembly as set forth in claim 3 wherein said peripheral edges defines four corners of said sunshade panel, and wherein said at least one guide flange includes four guide flanges with one associated with each corner.

6. An assembly as set forth in claim 3 including a handle recess molded into said sunshade panel to establish a grasping surface for sliding said sunshade panel between the open and closed positions.

7. A vehicle window assembly comprising:

a sliding glass panel;

a sunshade panel that is slidable between an open and closed position for covering said glass panel, said sunshade panel having first and second facings wherein said first facing defines an underside of said sunshade panel;

guide rails for guiding said sunshade panel;

a handle molded in one piece with said panel to form a cup-shaped handle recess enclosed at one end, said handle recess including walls protruding upwardly from said underside into said sunshade panel to establish a grasping surface for sliding said sunshade panel between the open and closed positions wherein said handle recess further includes a rim portion molded into said underside, said rim portion projecting downwardly from said underside thereby forming a boundary for a fabric material.

8. An assembly as set forth in claim 7 including guide flanges integrally formed in said sunshade panel to project outwardly from edges of said sunshade panel for interacting with said guide rails wherein said sunshade panel and said handle recess are formed of a first molded plastic material and said guide flanges are formed of a second molded plastic material that is more flexible than said first molded plastic material.

9. An assembly as set forth in claim 3 wherein said pair of lateral segments are positioned on opposite sides of said central segment, said lateral segments supporting said at least one guide flange.

10. An assembly as set forth in claim 9 wherein said central segment is formed of a fiberglass-reinforced molded plastic material and the lateral segments are formed of a fiberglass-free molded plastic material.

11. A vehicle window assembly comprising:

a sliding glass panel;

a sunshade panel that is slidable between an open and closed position for covering said glass panel;

guide rails for guiding said sunshade panel;

at least one guide flange projecting outwardly from an edge of said sunshade panel and interacting with said guide rails for guiding said sunshade panel between the open and closed positions to cover said glass panel; and a fabric material disposed on said guide flange such that said fabric material slides on said guide rails as said sunshade panel moves between said open and closed positions.

12. An assembly as set forth in claim 11 wherein said guide flange is defined by first and second projections that extend from said sunshade panel in opposed directions wherein each of said projections curve outwardly from said peripheral edge and taper to a distal tip.

13. An assembly as set forth in claim 12 wherein said projections extending from said sunshade panel such that said distal tip of said first projection is adjacent said distal tip of said second projection to define an integral slot.

14. An assembly as set forth in claim 13 wherein said fabric material spans said integral slot from at least said sunshade panel to said projections.

15. A vehicle window assembly comprising:

a sliding glass panel;

a sunshade panel slidable between an open and closed position for covering said glass panel, and which is defined by a perimeter having a pair of opposed longitudinal sides extending along the length of a vehicle interconnected by a pair of opposed lateral sides extending along the width of the vehicle, said sunshade panel including a pair of longitudinal segments extending along said longitudinal sides and a central segment interposed between said longitudinal segments;

guide rails for guiding said sunshade panel; and at least one guide flange projecting outwardly from each of said longitudinal sides and interacting with said guide rails to move said sunshade panel between the open and closed positions wherein said central segment is formed from a first material and said guide flange and longitudinal segments are formed from a second material that is more flexible than said first material, said central segment, longitudinal segments and guide flange being formed as a single molded piece.

16. An assembly as set forth in claim 15 wherein said central segment is formed of a fiberglass-reinforced molded plastic material and said pair of longitudinal segments are formed of a fiberglass-free molded plastic material.

17. An assembly as set forth in claim 15 wherein said first material is a fiber-reinforced molded plastic material and said second material is a molded plastic material with a lower fiber content than said first material.

\* \* \* \* \*